Patented Sept. 29, 1936

2,055,953

UNITED STATES PATENT OFFICE 2,055,953

VARNISH COMPOSITIONS AND METHOD OF MAKING SAME

Lloyd C. Swallen, Terre Haute, Ind., assignor to Resinox Corporation, New York, N. Y., a corporation of Delaware No Drawing. Application October 20, 1933, Serial No. 694,515

2 Claims. (Cl. 134—26)

My invention relates to improved resins and varnishes prepared therefrom. More specifically my invention relates to cresol-ketone-aldehyde resins and improved drying oil varnishes prepared therefrom.

In the past a number of processes have been disclosed for producing resinous condensation products from phenolic compounds, ketones, and aldehydes. However, most of the products resulting from these processes have been unsuited for the production of oil varnishes, due primarily to their low solubility in siccative oils. Some resins have been prepared from phenol, ketones and aldehydes which have had the advantage of oil solubility, but the varnishes prepared from these resins have had numerous disadvantages such as slow drying time, poor adhesion, poor resistance to water and alkali, etc.

I have now discovered that improved resins may be prepared from ortho-cresol, ketones, and aldehydes, which not only possess the advantage of oil solubility but also produce drying oil varnishes which have many advantages over the previously known varnishes of this type. My improved resins may be described as reaction products of formaldehyde with a mixture of bis-[4 hydroxy-5 methyl-phenyl]-dialkyl methane and bis-[4 hydroxy-5 methyl-phenyl]-dialkyl methane-ketone condensation product.

In the preferred manner of preparing the mixed intermediate products, ortho-cresol and a ketone are reacted preferably in the presence of an acid catalyst. This reaction is believed to give rise to a product consisting mainly of the 4-hydroxy substituted intermediate compound. In the examples and discussion below, therefore, the mixed intermediate will be referred to as a mixture of bis-[4 hydroxy-5 methyl-phenyl]-dialkyl methane and bis-[4 hydroxy-5 methyl-phenyl]-dialkyl methane ketone condensation product. It is to be understood, however, that my invention is not to be limited to this particular type of hydroxy substituted intermediate except where so limited in the appended claims.

My new resins may be prepared in the following manner: Suitable proportions of ortho-cresol and a ketone, for example, 2 mols. of ortho-cresol and 1 mol. of ketone are first reacted in the presence of a catalyst, such as hydrochloric acid. At the conclusion of the reaction the excess reactants and the acid used as a catalyst are removed by any suitable means. For example, the hydrochloric acid may be neutralized by means of a caustic soda solution and the resulting sodium chloride solution removed. The unreacted materials may then be removed by steam distillation. Carrying out the reaction in this manner gives a final product containing approximately 50% of bis-[4 hydroxy-5 methyl-phenyl]-dialkyl methane and bis-[4 hydroxy-5 methyl-phenyl]-dialkyl methane-ketone condensation product.

If preferred, the bis-[4 hydroxy-5 methyl-phenyl]-dialkyl methane may first be prepared by reacting 3 mols. of ortho-cresol with 1 mol. of ketone following the same general operating conditions just outlined. One mol. of the resulting bis-[4 hydroxy-5 methyl-phenyl]-dialkyl methane may then be reacted with less than 1 mol. of ketone to effect a partial conversion to the bis-[4 hydroxy-5 methyl-phenyl]-dialkyl methane-ketone condensation product.

The mixture of bis-[4 hydroxy-5 methyl-phenyl]-dialkyl methane and bis-[4 hydroxy-5 methyl-phenyl]-dialkyl methane-ketone condensation product obtained by either of the procedures just outlined is next reacted with an aldehyde, preferably in the presence of an acid catalyst. For this reaction it is preferred to utilize the aldehyde in a comparatively anhydrous and non-volatile form, such as paraformaldehyde, and to employ a proportion of less than .5 mol. of aldehyde per mol. of cresol used in making the intermediate. At the conclusion of the second stage of the reaction, any volatile materials, including the water formed in the reaction, are distilled off, after which the hot resin may be poured out to cool in the usual manner.

The resins prepared in this manner are clear, light colored materials, soluble in drying oils and having melting points ranging from 80° C. to 140° C., depending upon the amounts of formaldehyde reacted.

The invention may perhaps be better illustrated by the following specific example:

EXAMPLE I

A mixture of 4 parts pure o-cresol, 1 part of acetone and 0.2 part of concentrated hydrochloric acid were mixed in a suitable container, heated to 80–85° C. and maintained at that temperature for from 48 to 72 hours. The aqueous layer was then drawn off and the residue cooled to 40–50° C. and washed two or three times with water. Any acid remaining after the washing was neutralized with sodium bicarbonate. The resulting product, after separation from water, was steam distilled at a temperature of about 175° C. until the non-aqueous portion of the distillate became relatively small and consisted of a very thick yellow oil. The residue from this distillation, comprising the intermediate compound, was then melted at a temperature of about 100° C. and 8% of paraformaldehyde by weight was stirred in. When well dispersed, 0.5% of oxalic acid (anhydrous basis) was added and the heating continued until the initial reaction had subsided and foaming had ceased. At this point the mixture was transferred to a steam bath where it was heated for approximately 48 hours longer. The resin was then removed to a direct fired vessel where it was heated to 200° C. and then poured out to cool. The resulting resin was a light amber colored material having a melting point of 131–132° C. and a specific gravity of 1.14. The material was insoluble in petroleum hydrocarbons but soluble in acetone, hot aromatic hydrocarbons and in all drying oils.

It is to be understood, of course, that the above example is illustrative only and that my invention is not to be limited to the particular materials or amounts specified. The first stage of the reaction may be regulated so as to vary the relative proportions of beta.beta.bis-[4 hydroxy-5 methyl-phenyl]-propane and the beta.beta.bis-[4 hydroxy-5 methyl-phenyl]-propane-acetone condensation product. The proportion of the latter material in the intermediate product may generally be increased by using a high temperature and a longer time of reaction, and by increasing the proportion of acetone. By suitably changing these factors, it is possible to regulate the proportions of these products and thereby vary to an appreciable extent the properties of the final resin. For some purposes, however, increasing the proportion of the beta.beta.bis-[4 hydroxy-5 methyl-phenyl]-propane - acetone condensation product by the means enumerated above is not advisable owing to the fact that resins having a dark color, or other undesirable properties may be produced.

Likewise, in the second stage of the reaction the amount of aldehyde used may be varied to change the properties of the final product. In general, increased amounts of aldehyde tend to raise the melting point of the final resin. For most purposes it is preferred to employ the aldehyde in a concentration of from 0.25 to 0.5 mol. per mol. of o-cresol reacted in forming the mixed intermediate, and preferably in a concentration of approximately 0.4 mol. per mol. of o-cresol.

Although the above example is limited to specific reactants and catalysts, the applicability of this process generally to the preparation of resins from ortho-cresol and various aldehydes and ketones may readily be seen by those skilled in the art. In this respect, other ketones such as methyl ethyl ketone, methyl propyl ketone, ethyl propyl ketone, etc. may be regarded as equivalents of acetone and other aldehydes such as acetaldehyde, propionaldehyde, etc. may be regarded as equivalents of formaldehyde. An aqueous solution of the aldehyde may be used, but it is preferred in general to utilize a non-volatile, anhydrous material, such as a solid polymer or condensation product. Various catalysts other than those mentioned may also be employed. Condensation catalysts suitable for this type of reaction are well known to those skilled in the art. Hydrochloric acid is preferable, however, as it is very satisfactory and may readily be removed from the reaction product. In the second stage of the reaction no catalysts need be employed if an excess of aldehyde is used and the reaction time is extended; or, if desired, the usual types of acid or alkaline condensation catalysts may be used. In the case of the alkaline or strongly acid condensation catalysts, however, the resulting resin may be changed somewhat in its properties and may have an undesirably dark color. It is preferred, therefore, to utilize a weak acid, such as oxalic acid.

The resins prepared as outlined above are eminently suited for use in the preparation of oil varnishes. Varnishes prepared in the usual manner from these resins and a drying oil, such as China-wood oil, are quick drying finishes having extremely desirable properties, such as hardness, strong adhesion, high water resistance, high alkali resistance, etc. These resins are particularly adapted for use in conjunction with natural resins or modified natural resins, such as ester gum. For example, a high proportion of ester gum may be utilized in conjunction with these resins with a resulting slight decrease in drying time of the varnish, but no material effect upon the other desirable properties of the varnishes.

The use of my improved resins and varnishes may perhaps best be illustrated by the following specific examples. In these examples the resin employed was prepared as in Example I above, utilizing for the first stage of the reaction the following mixture:

| | Parts |
|---|---|
| o-Cresol | 4 |
| Acetone | 1 |
| Concentrated hydrochloric acid | 0.2 | and for the second stage of the reaction the following mixture:

| | Parts |
|---|---|
| Intermediate condensation product | 100 |
| Paraform | 9 |
| Anhydrous oxalic acid | 0.5 |

This resin will be referred to as 5 D-2 in the examples and discussions below.

EXAMPLE II (12½ gals. furniture varnish)

| | Parts | |
|---|---|---|
| Resin 5 D-2 | 1 | (25 lbs.) |
| China-wood oil | 4 | (12½ gals.) |
| Ester gum | 3 | (75 lbs.) |
| Oleum spirits | 6 | (20.4 gals.) |
| Dipentene | 2 | (7 gals.) |

The 5 D-2 resin and China-wood oil were heated to 240° C. (465° F.) in 25 minutes and held at that temperature for 25 minutes. The ester gum was then stirred in, and, when dissolved, the thinners were added. The oleum spirits employed in this example and in the following examples constitute a petroleum hydrocarbon fraction having a boiling range of 150° C. to 220° C. After cooling, sufficient lead and cobalt driers to give 0.04 part of lead and 0.0012 part of cobalt were added. The resulting varnish had the following properties:

| | |
|---|---|
| Color (Gardner 1933*) | 12 |
| Viscosity (Gardner Holdt**) | F. |
| Toughness (Kauri reduction***) | 40% |
| Hardness | Very good |
| Adhesion | Very good |
| Drying time, tack free (hrs.) | 4½ |
| Resistance to boiling water (hrs.) | 24+ |
| Resistance to boiling 5% soap (hrs.) | 3 |
| Resistance to cold 5% sodium hydroxide (hrs.) | 10 |

*G. G. Sward and J. R. Stewart, Circular No. 425 American Paint and Varnish Manufacturers Association.
**Physical and Chemical Examination of Paints, Varnishes, Lacquers and Colors—5th edition—Henry A. Gardner, Washington, D. C., 1930, page 247.
***Idem 549.

EXAMPLE III (25 gals. general purpose varnish or enamel vehicle)

| | Parts | |
|---|---|---|
| Resin 5 D-2 | 1 | (25 lbs.) |
| China-wood oil | 8 | (25 gals.) |
| Ester gum | 3 | (75 lbs.) |
| Oleum spirits | 12 | (40.4 gals.) |

The 5 D-2 resin and China-wood oil were heated together to 240° C. (465° F.) in 25 minutes and held at that temperature for 30 minutes. The ester gum was then added, and, when dissolved, the thinner was immediately added. After cooling, sufficient lead and cobalt driers to give 0.08 part of lead and 0.0024 part of cobalt were added.

This varnish had the following properties:

| | |
|---|---|
| Color (Gardner 1933) | 12 |
| Viscosity (Gardner Holdt) | F. |
| Toughness (Kauri reduction) | 120% |
| Hardness | Very good |
| Adhesion | Very good |
| Drying time, tack free (hrs.) | 5½ |
| Resistance to boiling water (hrs.) | 24+ |
| Resistance to boiling 5% soap (hrs.) | 3 |
| Resistance to cold 5% sodium hydroxide (hrs.) | 6 |

EXAMPLE IV (37½ gals. spar varnish)

| | Parts | |
|---|---|---|
| Resin 5 D-2 | 1 | (25 lbs.) |
| China-wood oil | 12 | (37½ gals.) |
| Ester gum | 3 | (75 lbs.) |
| Oleum spirits | 16 | (54 gals.) |

The 5 D-2 resin and the oil were heated together to 240° C. (465° F.) in 25 minutes and held at that temperature for 25 minutes. The ester gum was then added, and, when dissolved, the thinner was immediately added. After cooling, sufficient lead and cobalt driers to give 0.12 part of lead and 0.0036 part of cobalt were added.

This varnish had the following properties:

| | |
|---|---|
| Color (Gardner 1933) | 12 |
| Viscosity (Gardner Holdt) | F. |
| Toughness (Kauri reduction) | 160%+ |
| Hardness | Good |
| Adhesion | Very good |
| Drying time, tack free (hrs.) | 3¼ |
| Resistance to boiling water (hrs.) | 24+ |
| Resistance to boiling 5% soap (hrs.) | 1 |
| Resistance to cold 5% sodium hydroxide (hrs.) | 10 |

EXAMPLE V (25 gals. varnish—straight 5 D-2 resin)

| | Parts | |
|---|---|---|
| Resin 5 D-2 | 1 | (100 lbs.) |
| China-wood oil | 2 | (25 gals.) |
| Oleum spirits | 2⅔ | (35.7 gals.) |
| Dipentene | ⅓ | (4.6 gals.) |

The resin and oil were heated to 240° C. (465° F.) in 25 minutes and held at that temperature for 25 minutes. The thinners were then added, and, after cooling, sufficient lead and cobalt driers to give 0.02 part of lead and 0.0006 part of cobalt were added.

This varnish had the following properties:

| | |
|---|---|
| Color (Gardner 1933) | 17 |
| Viscosity (Gardner Holdt) | H |
| Toughness (Kauri reduction) | 150% |
| Hardness | Good |
| Adhesion | Good |
| Drying time, tack free (hrs.) | 2¾ |
| Resistance to boiling water (hrs.) | 24+ |
| Resistance to boiling 5% soap (hrs.) | 1½ |
| Resistance to cold 5% sodium hydroxide (hrs.) | 4½ |

It may be seen from the above examples that the varnishes prepared from my improved resins possess a combination of properties which constitutes a marked improvement over the varnishes previously available. In any single property my varnishes may be excelled by certain special finishes, but in this combination of properties which are important for coating materials my varnishes possess a marked advantage over the previously known materials. This fact is brought out in the following table in which a straight 5 D-2 varnish is compared with varnishes prepared from two of the best known types of oil-soluble phenol aldehyde resins, and a varnish prepared from a mixture of 5 D-2 resin and ester gum is compared with a varnish prepared from a well known rosin-modified type of phenol-aldehyde resin.

| Properties | Straight phenol-aldehyde type resins | | | Modified phenol-aldehyde type resins | |
|---|---|---|---|---|---|
| | Resin 5 D-2 | p-Phenyl-phenol-formaldehyde resin | p-Tert. amyl phenol-formaldehyde resin | 25% resin 5 D-2 75% ester gum | Rosin-modified phenol-formaldehyde resin |
| Drying time (In hrs.) | Good (2¾) | Good (2½) | Poor (8+) | Good (5½) | Good (4½) |
| Toughness (Kauri reduction test) | Good (150) | Good (140) | Good (150) | Good (110-150) | Good (110-150) |
| Hardness | Good | Good | Good | Good | Fair |
| Adhesion | Good | Poor | Fairly good | Good | Good |
| Water resistance (100° C. 24 hrs.) | Good | Good | Good | Good | Good |
| Alkali resistance (5% NaOH 25° C.) | Good | Good | Very good | Good | Fair |

It may be seen from the above table that the varnishes prepared from my improved resins are the only ones in the group which have a good rating in each of this important group of characteristics. Since a finishing material should be satisfactory in all of these characteristics rather than outstanding in any particular one, the advantages of my improved varnishes are believed to be apparent.

It is to be understood, of course, that my invention is not to be limited to the particular examples of varnishes given above. These were illustrative only and my improved resins are suitable for use in many types of varnishes, being equally satisfactory for clear varnishes or enamel vehicles. The ingredients of the varnishes and the method of cooking may be varied in any of the ways known to those skilled in the art. For example, instead of China-wood oil, other drying and semi-drying oils, such as linseed oil, perilla oil, fish oils, etc., may be used. Likewise, various other thinners, such as benzol, toluol, xylol, turpentine and petroleum naphtha may be employed. It should be noted, of course, that these materials are not solvents for the resins but merely may be added to a solution of the resin in drying oil without precipitating it. The usual driers, such as cobalt resinate, manganese resinate, lead resinate, linoleate, tungate, etc., may be used; and the usual pigments, such as zinc oxide, titanium dioxide, lithopone and the like, together with various other extenders, lakes, etc., may be employed, if desired. In general, it may be said that any modifications or the use of any equivalents which would naturally occur to one skilled in the art are included within the scope of my invention.

My invention now having been described, what I claim is:

1. An oleoresinous varnish characterized by normal drying properties, adhesion, resistance to water and alkali, the resinous constituents of which comprise essentially a major proportion of ester gum and a lesser proportion of a synthetic resin derived from the condensation of a mixture of beta.beta.bis-[4 hydroxy-5 methyl-phenyl]-propane and beta.beta.bis-[4 hydroxy-5-methyl-phenyl]-propane-acetone condensation product with from 0.1 to 0.5 mol. of formaldehyde per mol. of o-cresol reacted in producing said mixture of beta.beta.bis-[4 hydroxy-5 methyl-phenyl]-propane and beta.beta.bis-[4 hydroxy-5 methyl-phenyl]-propane-acetone condensation product, said proportion of ester gum and synthetic resin being such as to produce said characteristics in the varnish.

2. An oleoresinous varnish characterized by normal drying properties, adhesion, resistance to water and alkali, the resinous constituents of which comprise essentially ester gum and a synthetic resin derived from the condensation of a mixture of beta.beta.bis-[4 hydroxy-5 methyl-phenyl]-propane and beta.beta.bis-[4 hydroxy-5 methyl-phenyl]-propane-acetone condensation product with from 0.1 to 0.5 mol. of formaldehyde per mol. of o-cresol reacted in producing said mixture of beta.beta.bis-[4 hydroxy-5 methyl-phenyl]-propane and beta.beta.bis-[4 hydroxy-5 methyl-phenyl]-propane-acetone condensation product, the ratio of ester gum to said synthetic resin being of the order of 3:1.

LLOYD C. SWALLEN.